US005330299A

United States Patent [19]

Gates

[11] Patent Number: 5,330,299

[45] Date of Patent: Jul. 19, 1994

[54] DUAL CONTINUOUS FEED LAP JOINT MILLING TABLE FOR PAPER

[76] Inventor: Jon A. Gates, 15 Whitewood, Aliso Viejo, Calif. 92656

[21] Appl. No.: 987,354

[22] Filed: Dec. 7, 1992

[51] Int. Cl.[5] .................................... B23C 3/12

[52] U.S. Cl. .................... 409/138; 144/117 B; 144/253 R; 409/218

[58] Field of Search ............... 409/138, 218, 184, 204, 409/205; 144/359, 371, 90 A, 114 R, 124, 117 B, 253 R, 253 B

[56] References Cited

U.S. PATENT DOCUMENTS 1,607,193 11/1926 Fountain .................... 409/138 X
3,362,294 1/1968 Oxel .................... 409/138
3,528,338 9/1970 Cuma .................... 409/138
3,599,531 8/1971 Wright et al. .................... 409/138
3,664,229 5/1972 Cary .................... 409/138
4,540,391 9/1985 Fries, Jr. .................... 409/138 X

*Primary Examiner*—William Briggs

[57] ABSTRACT

A rectangular table 21 incorporating a series of heavy paper management rollers 12, 13, 14A, 14B, 18, and 19 that are engineered to allow the paper 10 to be drawn across said table's surface wherein a lower left hand lap joint 20A and opposing right hand upper lap joint 20B are simultaneously milled in and along the lateral edges of the passing paper 10 by the right hand lap joint milling machine 16 and opposing right hand milling machine 17 which are strategically recessed into the lateral edges of the table's surface. Ultimately, a paper 10 laminate 20 is produced through the described process which is used to form a continuous sheeting arrangement by bonding the lap joints 20A and 20B of individual vertically positioned sheets as the sheets are laminated to a prescribed surface.

1 Claim, 4 Drawing Sheets

DUAL CONTINUOUS FEED LAP JOINT MILLING TABLE FOR PAPER

BACKGROUND—FIELD OF INVENTION

This invention relates to the lap joint milling process, most specifically to milling lap joints in heavy grade paper for the purpose of bonding jointed sheets of paper together in order to form a smooth continuous sheeting arrangement.

BACKGROUND—DESCRIPTION OF PRIOR ART

The original development of this machine evolved out of the need to produce a paper product called "Lead Abatement and Wallboard Laminate" which is simultaneously being applied for patenting. The specifications for this laminate product required a heavy paper stock (sold in 25,000 linear foot rolls) with a lower lap joint and opposing upper lap joint milled in and along the lateral edges of the paper. Unfortunately, no prior art could be found to accomplish this objective and it soon became apparent that such a machine had to be designed and built to create the laminate.

Woodworking power tools, such as the jointer, planer, and router provided some evidence of how this milling machine had to be built. All three of these machines operate at high revolutions. Looking closer at the planer, testing showed that the machine could shave a thin layer (measured in one-thousandths of an inch) off of a narrow strip of heavy paper stock without tearing the paper. This was because the milling or axillary blade of the planer cut the paper from above and because the paper stock was fed into the planer traveling on a stable surface. Unfortunately, a planer is not designed to mill the needed lap joints required for the laminate process.

The jointer table proved totally ineffective because it was designed to mill from below the traveling plate. Furthermore, the jointer table milled only rigid stock, not flexible stock such as the paper needed for the laminate product.

The router table was also useless in producing the laminate product because it was designed to mill from the underside or lateral side of the traveling plate. Additionally, the router table was useless in milling the paper stock needed for the laminate process because this machine was dependent on the rigidity of the stock passing over or aside the axillary blade.

Observing the action of all three of these woodworking power tools did, however, provide some direction in solving the lap joint milling problem. The following basic observations provided the fundamental engineering objectives for the Dual Continuous Feed Lap Joint Milling Table for Paper:

1. A primary traveling surface was needed as exhibited in the planer table.
2. A high revolution motor was needed as exhibited in all three woodworking power tools.
3. An open-ended axillary blade was needed to mill the required lap joint, as in the router and jointer tables, but the axillary blade had to be positioned in such a manner that it accepted the paper stock between itself and the stabilizing traveling surface as exhibited in the planer table.

After observing these woodworking power tools, the Dual Continuous Feed Lap Joint Milling Table was built as follows:

A rectangular-shaped table was built that served as a primary traveling surface. The width was designed slightly wider than the width of the paper stock, so that guide rails could be countersunk into the lateral edges of the table. The length of the table was twice the width in order to provide for insured stability as the paper stock traveled through the milling process.

Paper management rollers were added to the far ends of the table, in order to control the traveling level of the paper in relation to the table's surface and to control the drift of the paper stock.

Two lap joint mills were built for the purpose of milling a left lower lap joint and right upper lap joint simultaneously in and along the lateral edges of the paper stock as required. These mills were built on stands which have a base plate on the top. On the base plate, a high revolution motor was mounted horizontally within a compression type motor mount. The motor directly drives an axillary blade which is mounted off the motor's shaft by means of a chuck lock.

This arrangement was derived by first purchasing a router, Type 4, Series #160205 made by Porter-Cable Corporation of Jackson, Tenn.

Three embodiments of the router were used to build the mills: the motor, the chuck, and the separately purchased axillary blade. The router's depth adjustment casing and adjoining handles were removed and discarded, leaving the needed motor, chuck, and axillary blade.

An adjustable pitch plate was then designed as an independent secondary traveling surface, specifically to work in conjunction with the axillary blade. The plate was built to ride above the axillary blade on the milling machine. The complete assembly of the milling machine was placed on the left side of the table to mill the lower lap joint. Correspondingly, the right hand machine was designed and built with an adjustable pitch plate riding below the axillary blade so as to respectively mill the upper lap joint.

Each milling machine was strategically set into the lateral edges of the table's surface so that the paper stock passed through the upper and opposing lower lap joint mills simultaneously.

OBJECTS AND ADVANTAGES

1. The milling table accepts a continuous feed of paper stock.
2. The required lap joints milled in and along the lateral edges of the paper stock can be milled simultaneously.
3. The table can be altered to accept various widths of paper.
4. The table can be made of steel, wood, aluminum, etc., so long as it is built squarely and stable.
5. The table can be adjusted to compensate for uneven ground.

Further objects and advantages will become apparent from a consideration of the drawings and ensuing description.

BRIEF DESCRIPTION OF THE DRAWINGS

In the drawings, closely related figures have the same number but different alphabetic suffixes.

REFERENCE NUMERALS IN DRAWINGS

Figure 1:
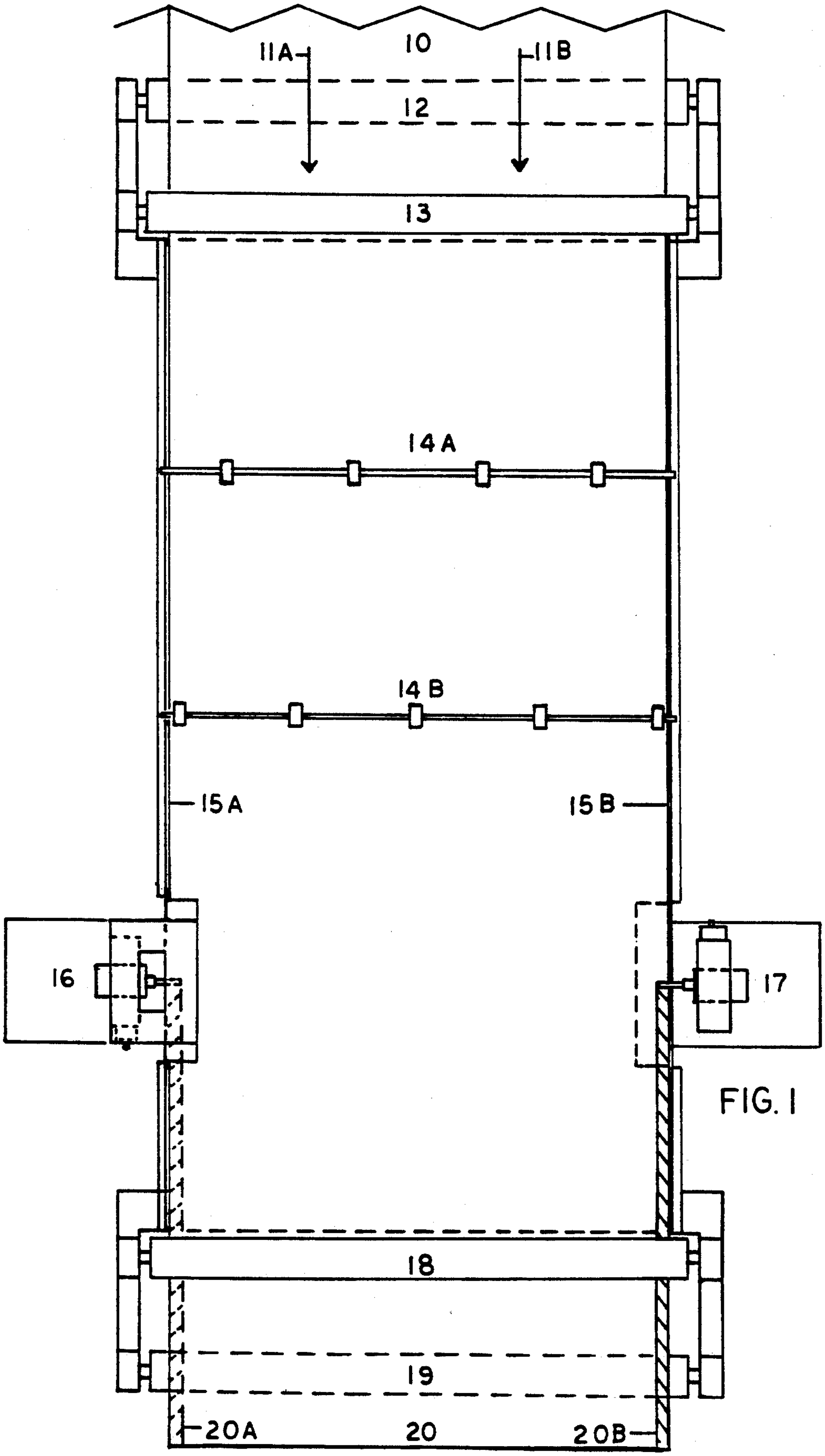
FIG. 1 shows the top view of the Dual Continuous Feed Lap Joint Milling Table with paper in place being milled.

10: paper stock
11A: paper feed direction arrow
11B: paper feed direction arrow
12: entry drag roller
13: entry drift control roller
14A: fore surface stabilizing roller
14B: aft surface stabilizing roller
15A: left guide rail
15B: right guide rail
16: left hand lap joint milling machine
  A: base plate
  B: split compression motor mount
  C: motor
  D: axillary milling blade
  E: blade rotation arrow
  F: chuck lock
  G: motor mount top plate
  H: motor mount anchor bolts
  I: adjustable pitch plate mounting bolts
  J: adjustable pitch plate
  K: variable speed electrical switch
  L: paper feed arrow
17: right hand lap joint milling machine
  A: base plate
  B: split compression motor mount
  C: motor
  D: axillary milling blade
  E: blade rotation arrow
  F: chuck lock
  G: motor mount top plate
  H: motor mount anchor bolts
  I: adjustable pitch plate mounting bolts
  J: adjustable pitch plate
  K: variable speed electrical switch
  L: paper feed arrow
18: exit drift control roller
19: exit drag roller
20: wallboard laminate (finished product)
  A: left lower lap joint
  B: right upper lap joint
21: table
  A: left adjustable leg mount
  B: right adjustable leg mount
22: stand
  A: left adjustable leg mount
  B: right adjustable leg mount

STATIC DESCRIPTION OF FIGS. 1 AND 2

Figure 2:
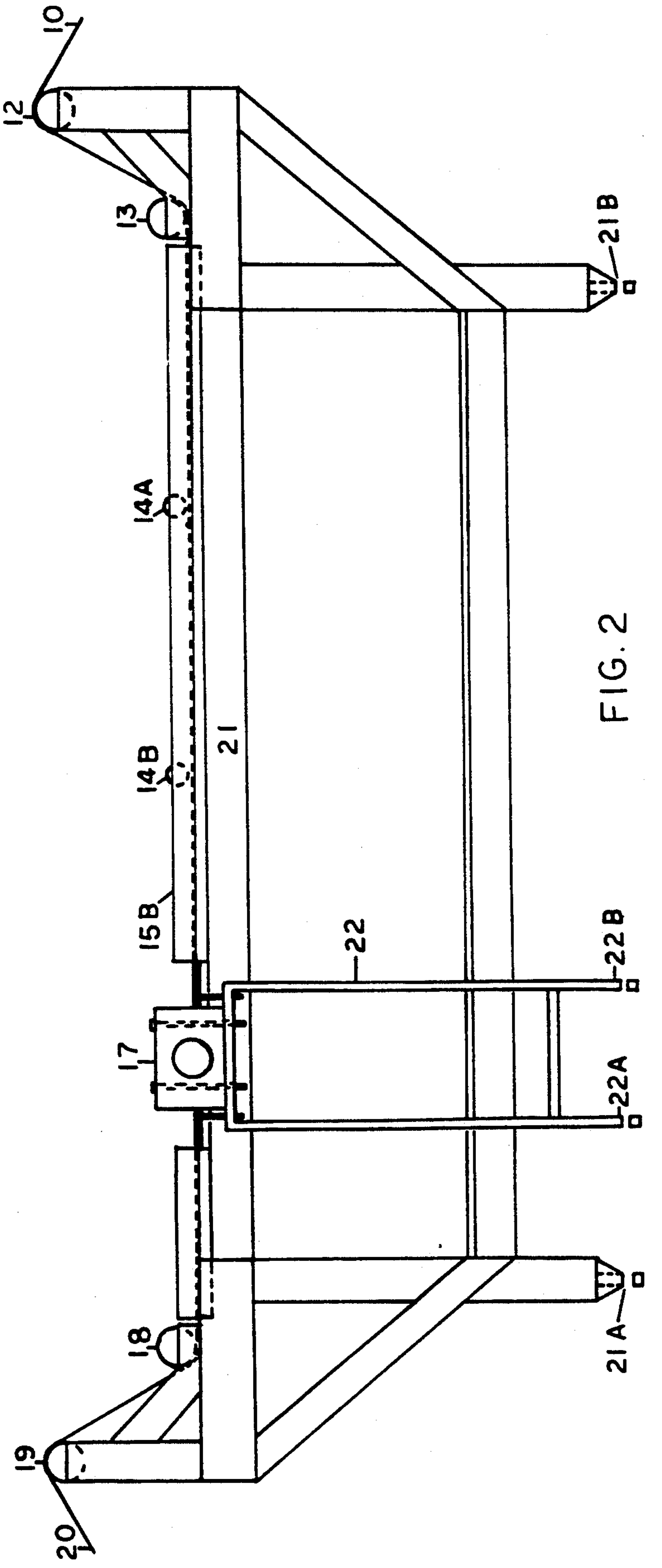
FIG. 2 shows the right side view of the Dual Continuous Feed Lap Joint Milling Table with paper in place.

FIG. 1 (top view) exhibits the broadest operational description of the lap joint milling process and FIG. 2 (right side view) presents the broadest static embodiment of this invention.

FIG. 2 shows the rectangular shaped table 21 with the entry drift control roller 13 (to the right) and the exit drift control roller 18 (to the left) mounted horizontally, off and slightly above the far ends of the table's surface.

The entry drag roller 12 (to the right) and the exit drag roller 19 (to the left) are further mounted substantially higher, slightly behind and parallel to said drift control rollers 13 and 18.

The surface stabilizer rollers 14A and 14B are also parallel with said rollers 13 and 18, and 12 and 19 wherein 14B is mounted approximately mid-table and 14A is mounted approximately one-fourth the distance into and at said table's surface from the right.

The stand 22 is positioned approximately half way between mid-table and said table's left surface end.

The adjustable leg mounts 22A and 22B are mounted into the base of the legs of said stand, as are the adjustable leg mounts 21A and 21B of the table 21. The left side view of the stand 22 and table 21 (not shown) would represent the same in reverse.

FIG. 1 (top view) embodies the following static descriptions not shown in FIG. 2:

The guide rails 15A (left side) and 15B (right side) are mounted vertically out of the lateral edges of the table 21 with the paper stock 10 traveling between as directed by the paper feed arrow 11A and 11B.

The lower left lap joint milling machine 16 and the upper right lap joint milling machine 17 are positioned between mid-table and table's 21 surface end. Both machines are also recessed into the table's 21 lateral surface.

STATIC DESCRIPTION OF FIGS. 3 AND 4

Figure 3:
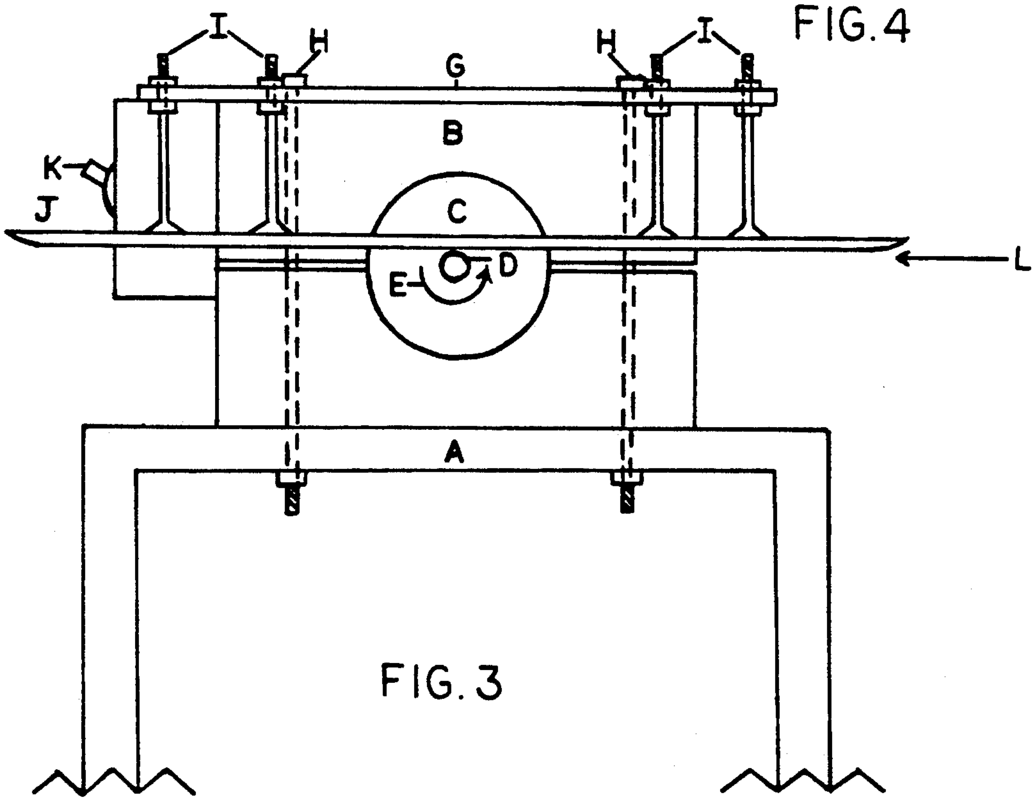
FIG. 3 shows an exploded front view of reference numeral 16 (listed below) showing the left hand lap joint miller.

FIG. 3 (exploded front view of numeral 16) begins with the base plate A wherein a motor C rests horizontally in a compression type motor mount B. The said motor mount B has a top plate G through which the motor mount bolts H descend through the motor mount B and further moored into the base plate A.

The top plate G of the left hand lower lap joint milling machine 16 also serves as a mooring plate for the adjustable pitch plate J which is positioned slightly above the axillary blade D. The pitch plate mounting bolts I are welded into the top side of the pitch plate J and further ascend through the bottom side of the top plate G and bolted into place from above and below.

The axillary blade D is held firmly in line with the motor's C shaft with a chuck lock F (FIG. 4) and the motor C is provided electricity through a variable speed electrical switch K.

The motor is driven in a counter clockwise rotation E (rotation arrow).

STATIC DESCRIPTIONS OF FIGS. 5 AND 6

Figure 4:
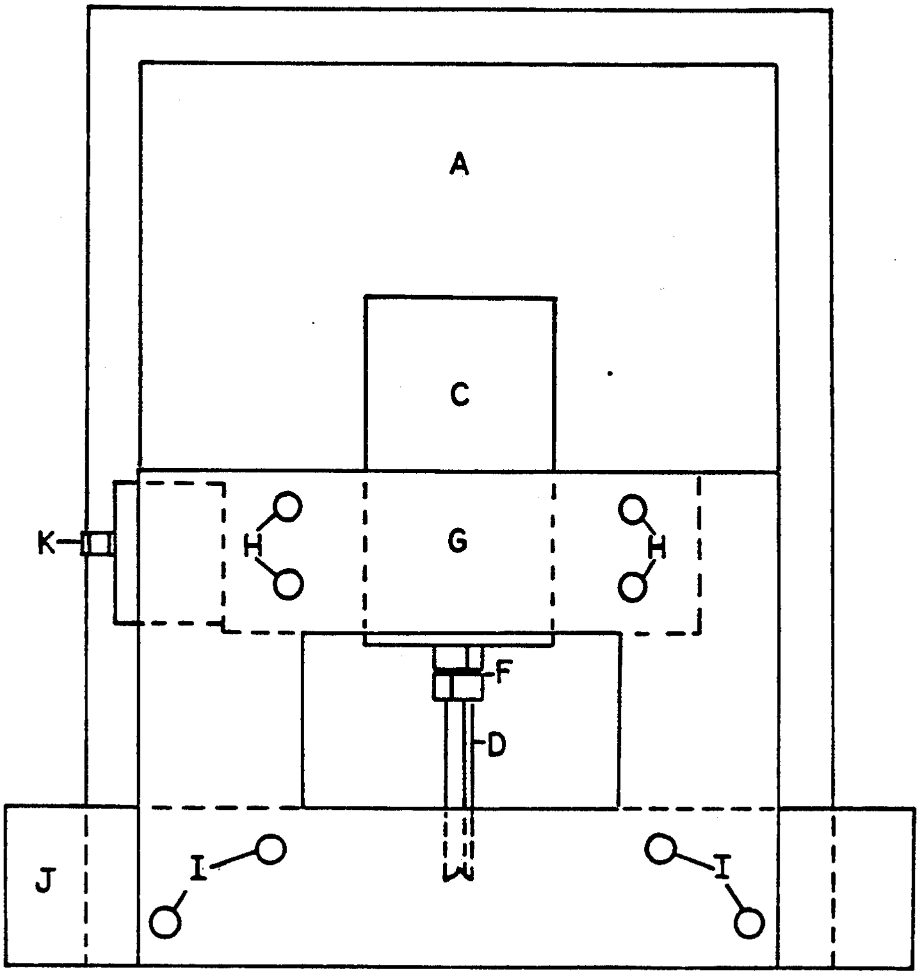
FIG. 4 shows an exploded top view of reference numeral 16 (listed below) showing the left hand lap joint miller.
Figure 6:
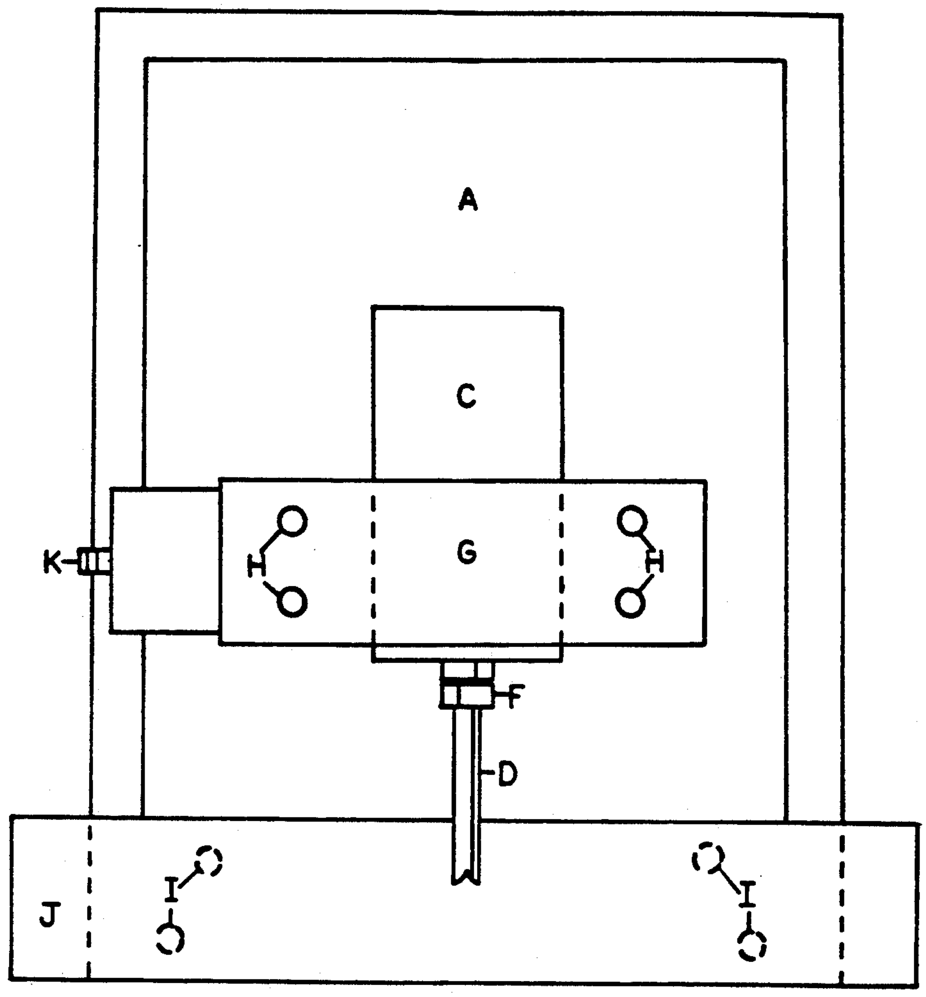
FIG. 6 shows an exploded top view of reference numeral 17 (listed below) showing the right hand lap joint miller.
Figure 5:
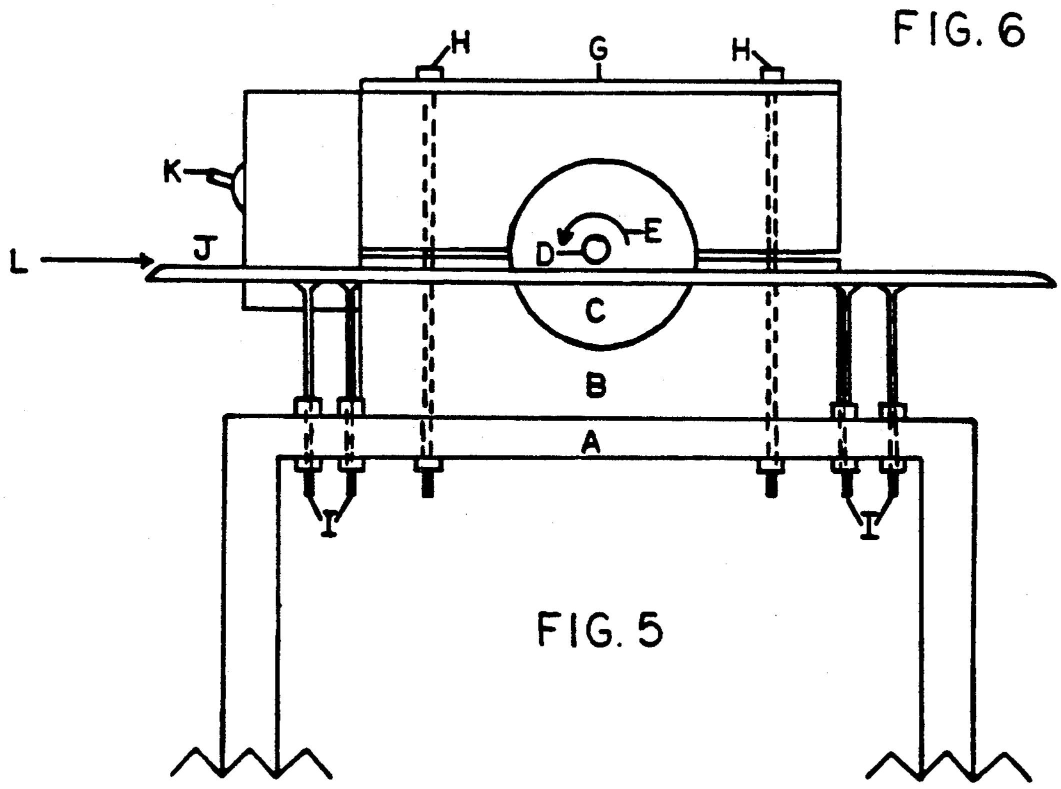
FIG. 5 shows an exploded front view of reference numeral 17 (listed below) showing the right hand lap joint miller.

FIG. 5 (front view) and FIG. 6 (top view) are exploded views of the reference numeral 17 and are almost identical in element arrangement to FIGS. 3 and 4 except for the mounting of the pitch plate J.

On the right hand milling machine 17, the pitch plate J is stationed below the axillary blade D and further mounted into the base plate A. The pitch plate mounting bolts I are welded to the bottom of the adjustable pitch plate J and descend through the base plate A wherein they are locked into position with lock nuts above and below the base plate A.

OPERATIONAL DESCRIPTION OF FIGS. 1 AND 2

FIG. 1 (top view) presents the strongest embodiment of this invention's operational characteristics. The paper 10 is drawn off a roll of paper stock (not shown) through a series of rollers divided by the table's 21 surface which has opposing lap joint mills 16 and 17 recessed into the lateral edges, whereby the lateral edges of the paper 10 have a lower lap joint 20A and an upper lap joint 20B simultaneously milled in and along said paper's lateral edges.

The table's 21 surface is rectangular in shape with an entry drift roller 13 and exit drift roller 18 positioned at the far ends. These two rollers are engineered to keep the paper 10 traveling at the table's surface and to control lateral paper drift. Drift compensation is accomplished by having said rollers' left axle mounts fixed on center and having the right hand roller axles mounts slightly adjustable fore and aft. Accordingly, the entrance and exit drag rollers 12 and 19 provide the resistance needed to make the said drift rollers function. The said drag rollers also assist in limiting backlash created by the paper stock roll and drawing equipment (not shown).

The guide rails 15A and 15B are primarily used as a visual aid whereby the drift rollers can be set.

The stabilizer rollers 14A and 14B are engineered to further ensure paper stability by holding the paper down before entering the lap joint mills 16 and 17.

The left hand milling machine 16 and opposing right hand milling machine 17 are recessed into the lateral edges of the table 21 at the surface so that when the paper 10 is drawn passed, the left lower lap joint 20A is milled simultaneously with the right upper lap joint 20B.

At this stage, the paper 10 is transformed into a continuous sheet of laminate 20 which passes under the exit drift roller 18, over the exit drag roller 19 and onto a pickup roll with affixed drawing and roll release equipment (not shown).

OPERATIONAL DESCRIPTION OF FIGS. 3, 4, 5, AND 6

The lap joint mills 16 (FIGS. 3 and 4) and 17 (FIGS. 5 and 6) hold all the same embodiments, but some of those embodiments are arranged differently.

In FIG. 3 (front view), the paper 10 enters from the right and travels under the adjustable pitch plate J. As the paper 10 is drawn further in, it glides between the table's lateral surface and the pitch plate J wherein the said paper is introduced to the counter clockwise rotation E of the axillary blade D.

The axillary blade rotates at a very high rate of revolution (approximately 15,000 to 20,000 RPM) and is set by the variable speed control switch K.

The exact rate is determined by the draw rate and actual visual inspection of the post-milled area. At this high RPM, the axillary blade D virtually forces the paper 10 up into the pitch plate J whereby the resistance and stability of the said plate is used to mill approximately half the thickness of the paper 10.

The axillary blade D is recessed into the table's surface wherein the blade breaks the table surface enough so that the pitch plate J can be adjusted for milling depth without locking up the paper 10 between the table's surface and the said plate. Said blade is also set into the lateral edge far enough to mill the full width of the required lap joint.

The adjustable pitch plate J can also be considered a refined secondary surface that is tuned to the higher needs of the individual milling machine.

OPERATIONAL DESCRIPTION OF FIGS. 5 (FRONT VIEW) AND 6 (TOP VIEW)

The right hand lap joint milling machine 17 has the paper 10 entering from the left. The pitch plate J is recessed into the table's surface where the top of said plate may rise slightly above said surface. This reversed configuration provides for milling of the required upper lap joint.

Again (in reverse), the counter clockwise rotation of the axillary blade D forces the paper 10 down into the pitch plate J and uses the resistance and stability of said plate to mill the required joint.

I claim:

1. A dual continuous feed lap joint milling machine for milling lap joints on upper and lower opposite lateral edges of a planar workpiece comprising:

support having a surface for supporting said workpiece and first and second recesses in said surface at opposed lateral positions;

first and second milling devices position adjacent respective ones of said recesses wherein said first and second milling devices each comprise: a variable speed high revolution motor driving a shaft and having a chuck lock mounting, a motor mount having means for mounting a said motor in a horizontal position and a first plate extending from said motor mount;

a rectangular pitch plate suspended slightly spaced from the milling blade by four machine threaded pins welded by the head to said pitch plate, positioned in such a manner so that each joint extends slightly from inside each corner of the rectangular pitch plate, said pins extending in and through the motor mount first plate, which extends adjacent the pitch plate, said pins being adjustably attached to said first plate wherein the space between the pitch plate and the milling blade may be adjusted, and said milling blades and said pitch plates being positioned to mill the lower lateral edge and the upper lateral edge of opposite sides of said planar workpiece.

* * * * *